US006972531B2

(12) United States Patent
Krummel

(10) Patent No.: US 6,972,531 B2
(45) Date of Patent: Dec. 6, 2005

(54) METHOD FOR OPERATING AT LEAST ONE LOW-PRESSURE DISCHARGE LAMP

(75) Inventor: Peter Krummel, Traunreut (DE)

(73) Assignee: Patent-Treuhand-Gesellschaft für Elektrische Glühlampen mbH

( * ) Notice: Subject to any disclaimer, the term of this patent is extended or adjusted under 35 U.S.C. 154(b) by 0 days.

(21) Appl. No.: 10/944,849

(22) Filed: Sep. 21, 2004

(65) Prior Publication Data

US 2005/0067980 A1 Mar. 31, 2005

(30) Foreign Application Priority Data

Sep. 29, 2003 (DE) ................................ 103 45 610

(51) Int. Cl.[7] .......................... G05F 1/00; H02M 3/335

(52) U.S. Cl. ...................... 315/309; 315/219; 315/105; 363/21.12; 363/16

(58) Field of Search ........................ 315/309–311, 219, 315/291, 209 R, 224, 225, 105, 106, 108, 315/117, 118; 363/21.12, 21.08, 16, 15

(56) References Cited

U.S. PATENT DOCUMENTS

| | | | | |
|---|---|---|---|---|
| 6,366,031 | B2 | 4/2002 | Klien | 315/291 |
| 2003/0076055 | A1 * | 4/2003 | Hooijer et al. | 315/224 |
| 2003/0122499 | A1 * | 7/2003 | Busse et al. | 315/209 R |
| 2005/0067973 | A1 * | 3/2005 | Beij et al. | 315/209 R |

FOREIGN PATENT DOCUMENTS

| | | |
|---|---|---|
| WO | 00/72640 | 11/2000 |

* cited by examiner

*Primary Examiner*—Tuyet Thi Vo
(74) *Attorney, Agent, or Firm*—Carlo S. Bessone

(57) ABSTRACT

A method for operating at least one low-pressure discharge lamp having heatable lamp electrodes, in which, during the preheating phase of the lamp electrodes, the type of lamp is identified. In this case, the temperature dependence of the electrical resistance of the lamp electrodes is exploited.

9 Claims, 4 Drawing Sheets

METHOD FOR OPERATING AT LEAST ONE LOW-PRESSURE DISCHARGE LAMP

I. TECHNICAL FIELD

Figure 1:
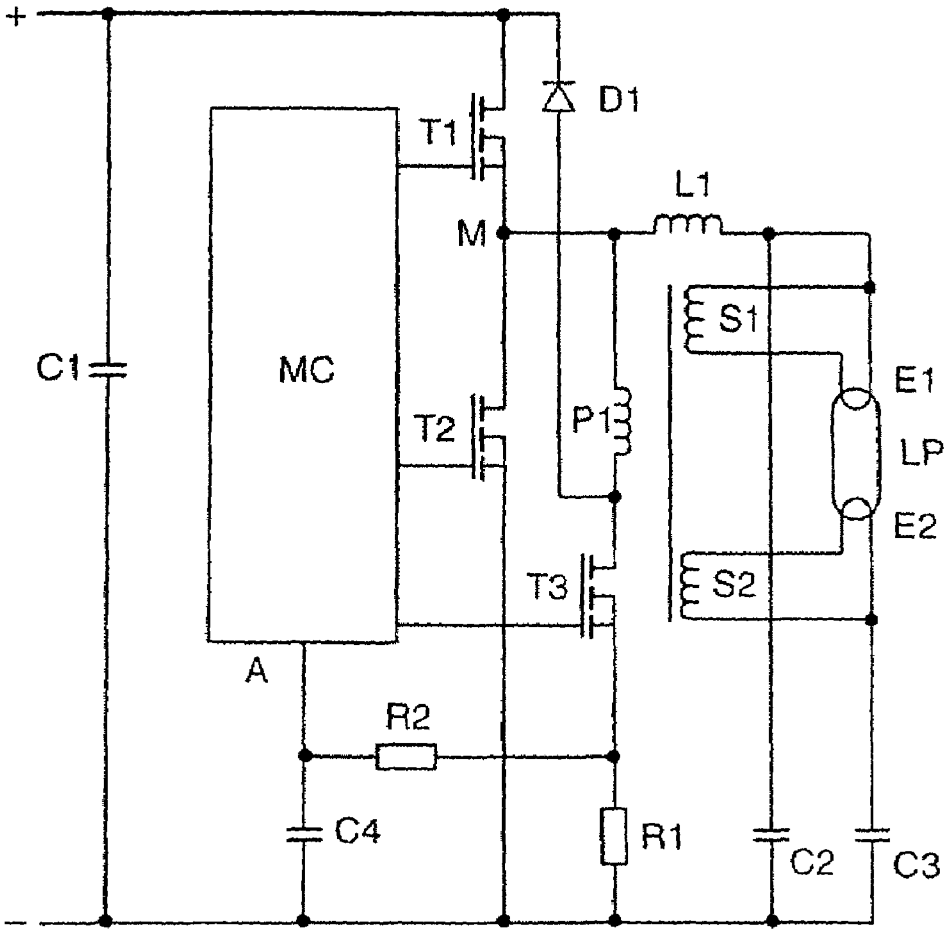

The invention relates to a method for operating at least one low-pressure discharge lamp by means of an inverter, in which the lamp electrodes of the at least one low-pressure discharge lamp have a heating current applied to them during a heating phase prior to the ignition of the gas discharge in the at least one low-pressure discharge lamp by means of a transformer, whose primary-side current is clocked by means of a controllable switching means, and the change in the electrical resistance of at least one lamp electrode is monitored.

II. BACKGROUND ART

The laid-open specification WO 00/72640 A1 discloses a circuit arrangement and a method for operating a low-pressure discharge lamp by means of a half-bridge inverter, in which the lamp electrodes of the at least one low-pressure discharge lamp have a heating current applied to them during a heating phase prior to the ignition of the gas discharge in the at least one low-pressure discharge lamp by means of a transformer, whose primary-side current is clocked by means of a controllable switching means, and the change in the electrical resistance of at least one lamp electrode is monitored in order for it to be used to identify the type of low-pressure discharge lamp connected to the operating device. The change in the electrical resistance of the lamp electrode is monitored by means of a resistor which is arranged on the secondary side of the transformer.

III. DISCLOSURE OF THE INVENTION

The object of the invention is to provide a simplified method for identifying the type of low-pressure discharge lamp connected to the operating device.

This object is achieved according to the invention by the method described below. Particularly advantageous embodiments of the invention are described in the dependent patent claims.

The method according to the invention for operating at least one low-pressure discharge lamp by means of an inverter, in which the lamp electrodes of the at least one low-pressure discharge lamp have a heating current applied to them during a heating phase prior to the ignition of the gas discharge in the at least one low-pressure discharge lamp by means of a transformer, whose primary-side current is clocked by means of a controllable switching means, and the change in the electrical resistance of at least one lamp electrode is monitored, is characterized according to the invention in that the controllable switching means is switched in synchrony with a first inverter switching means, and the change in the electrical resistance of the at least one lamp electrode is determined by means of a resistive element which is arranged on the primary side of the transformer by the voltage drop across the resistive element being evaluated at at least two different points in time during the heating phase.

According to the method according to the invention, the current through the primary winding of the transformer and not the heating current on the secondary side of the transformer is evaluated during the preheating phase of the lamp electrodes for the purpose of identifying the type of lamp. This makes it possible to dispense with measuring arrangements in the secondary circuits of the transformer and to correspondingly simplify the monitoring apparatus. In addition, the method according to the invention and the circuit arrangement according to the invention can advantageously be used for operating two or more low-pressure discharge lamps, since multi-lamp operation does not require any additional measuring apparatus. The increase in the electrical resistance of the lamp electrodes as the level of heating increases is detected according to the invention, independently of the number of low-pressure discharge lamps operated in the load circuit, merely by using a resistive element on the primary side of the transformer by the voltage drop across the resistive element being evaluated at at least two different points in time during the heating phase.

The voltage drop across the resistive element is preferably evaluated at a first point in time which is arranged in a time window in the range from 10 ms to 50 ms after the beginning of the heating phase, in order to be able to reliably evaluate the cold resistance of the lamp electrodes. In addition, the voltage drop across the resistive element is advantageously evaluated at a second point in time which is arranged at the end of the heating phase, in order to be able to reliably evaluate the hot resistance of the lamp electrodes. The comparison of these two measured values may be used to determine whether the lamp electrodes were cold at the beginning of the heating phase or whether an equivalent resistance was connected in place of the lamp. Even the type of lamp can be determined merely from the second measured value. According to the preferred embodiment of the invention, the type of lamp can only be identified when the absolute value of the difference between the two abovementioned measured values exceeds a predetermined variable. Otherwise, the assumption is made that either an equivalent resistance is connected to the operating device in place of a low-pressure discharge lamp or the lamp electrodes had not yet cooled down sufficiently at the beginning of the heating phase since the last lamp operation.

The evaluation of the voltage drop across the resistive element is advantageously carried out by means of a low-pass filter. The low-pass filter averages the voltage drop across the resistive element over a time interval which is long compared to the switching clock of the controllable switching means and of the inverter, but short compared to the duration of the heating phase of the lamp electrodes. The duration of the heating phase prior to the ignition of the gas discharge in the lamp is preferably constant and is approximately 600 ms, whereas a switching clock of the controllable switching means in the heating phase requires approximately 10 $\mu$s.

The energy stored in the primary winding of the transformer is advantageously dissipated during the switch-off time of the controllable switching means with the aid of a second inverter switching means, in order to prevent a voltage overload of the controllable switching means. The energy stored in the primary winding is preferably fed back to the intermediate circuit capacitor which acts as a DC voltage source for the inverter in order to be able to use it for the lamp operation.

IV. BRIEF DESCRIPTION OF THE DRAWINGS

Figure 2:
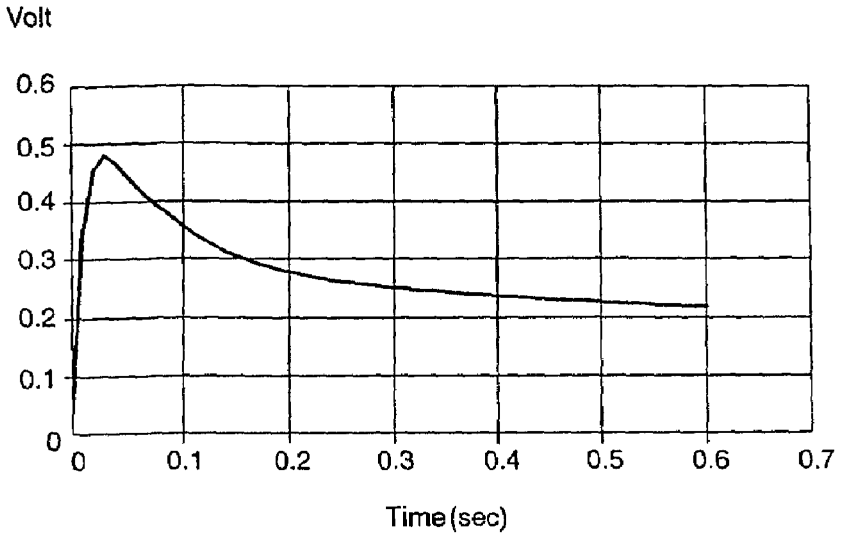
Figure 3:
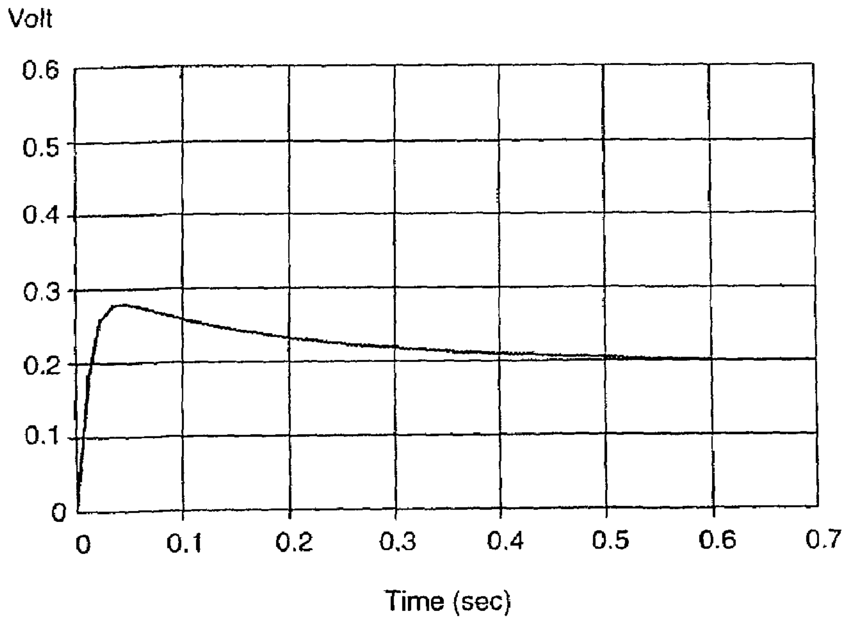
Figure 4:
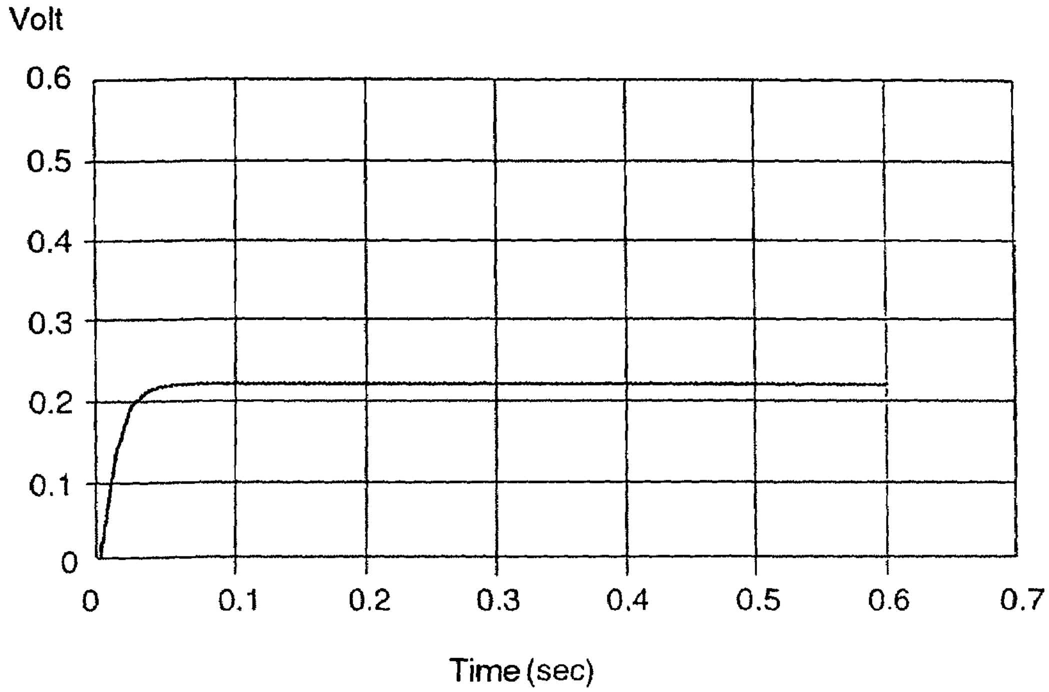
Figure 5:
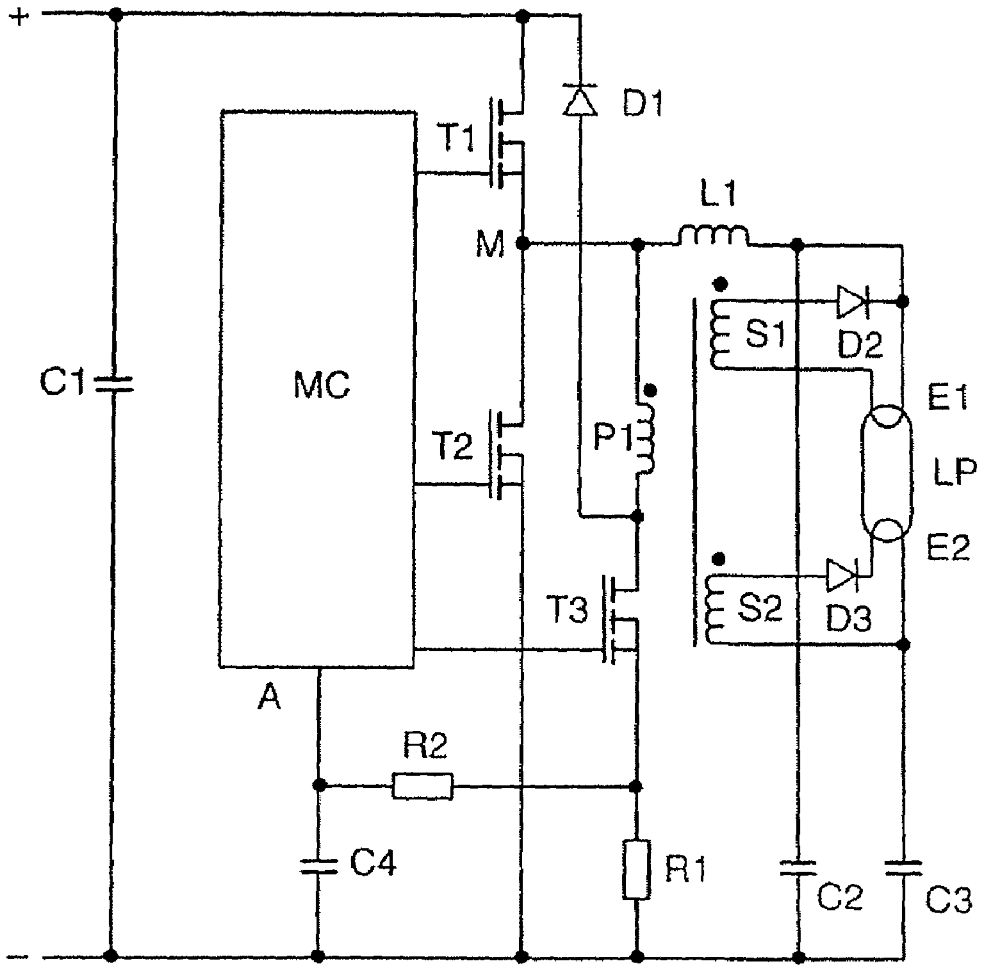

The invention is explained in more detail below with reference to a preferred exemplary embodiment. In the drawing:

FIG. 1 shows a schematic illustration of a first circuit arrangement for carrying out the method according to the invention, FIG. 2 shows the time characteristic of the voltage drop across the resistor through which the primary-side current of the transformer flows following averaging by means of the low-pass filter for a first operating state, FIG. 3 shows the time characteristic of the voltage drop across the resistor through which the primary-side current of the transformer flows following averaging by means of the low-pass filter for a second operating state, FIG. 4 shows the time characteristic of the voltage drop across the resistor through which the primary-side current of the transformer flows following averaging by means of the low-pass filter for a third operating state, and FIG. 5 shows a schematic illustration of a second circuit arrangement for carrying out the method according to the invention.

V. BEST MODE FOR CARRYING OUT THE INVENTION

The circuit arrangement depicted in FIG. 1 is an electronic ballast for operating a low-pressure discharge lamp, in particular a fluorescent lamp.

This circuit arrangement has two field effect transistors T1, T2 which are arranged in the manner of a half-bridge inverter. The two field effect transistors receive their control signal from a microcontroller MC. Arranged in parallel with the DC voltage input of the half-bridge inverter T1, T2 is an intermediate circuit capacitor C1 having a comparatively high capacitance. The intermediate circuit capacitor C1 acts as a DC voltage source for the half-bridge inverter. Applied to the intermediate circuit capacitor C1 is a DC voltage of approximately 400 volts which is generated from the system AC voltage by means of a system voltage rectifier (not shown) and a step-up converter (not shown). The intermediate circuit capacitor C1 is arranged in parallel with the voltage output of the step-up converter. Connected to the output M of the half-bridge inverter is a load circuit which is in the form of a series resonant circuit and essentially comprises the lamp inductor L1 and the starting capacitor C2. Connected in parallel with the starting capacitor C2 are the discharge path of the fluorescent lamp LP and the coupling capacitor C3, which is charged during the lamp operation in the transient state of the half-bridge inverter to half the supply voltage of the half-bridge inverter. The lamp electrodes E1, E2 of the fluorescent lamp LP are in the form of electrode filaments having in each case two electrical connections. Connected in parallel with the electrode filaments E1, E2 is in each case a secondary winding S1, S2 of a transformer which serves the purpose of inductively heating the electrode filaments E1, E2. The primary winding P1 of this transformer is connected in series with the switching path, of a further field effect transistor T3, whose control electrode likewise has control signals applied to it by the microcontroller MC, and of a measuring resistor R1. The series circuit comprising the components P1, T3 and R1 is connected to the output M of the half-bridge inverter. A first connection of the primary winding P1 is connected to the output or center tap M of the half-bridge inverter and to the lamp inductor L1, whereas the second connection of the primary winding P1 is connected to the field effect transistor T3 and, via a diode D1 in the DC forward direction, to the connection (+), which is at a high potential, of the intermediate circuit capacitor C1. A first connection of the measuring resistor R1 is connected to the ground potential (−), whereas the second connection of the measuring resistor is connected to the field effect transistor T3 and to the voltage input A of the microcontroller MC via a low-pass filter R2, C4.

By means of the coupling capacitor C3, which is charged to half the supply voltage of the half-bridge inverter, and the alternately switching transistors T1, T2 of the half-bridge inverter, the load circuit L1, C2, LP has, in a known manner, a radio-frequency AC voltage applied to it, whose frequency is determined by the switching clock of the transistors T1, T2 and is in the range from approximately 50 kHz to approximately 150 kHz. Prior to the ignition of the gas discharge in the fluorescent lamp LP, its lamp electrodes E1, E2 have a heating current applied to them inductively by means of the transformer P1, S1, S2. For this purpose, the transistor T3 is switched on and off by the microcontroller MC in synchrony with the transistor T1. During the switch-on time of the transistors T1, T3, a current thus flows through the primary winding P1 and the measuring resistor R1. During the switch-off time of the transistors T1, T3, the current flow through the measuring resistor R1 is interrupted. The energy stored in the magnetic field of the primary winding P1 is fed to the intermediate circuit capacitor C1 via the diode D1 during the switch-off time of the transistors T1, T3 and the switch-on time of the transistor T2. Owing to the alternately switching transistors T1, T2 and the transistor T3 switching in synchrony with the transistor T1, a radio-frequency current flows through the primary winding P1, this current inducing corresponding heating currents for the electrode filaments E1, E2 in the secondary windings S1, S2. With the aid of the low-pass filter R2, C4, the voltage drop across the measuring resistor R1 is averaged over a time interval of two or more switching clocks of the transistor T3 and fed to the voltage input A of the microcontroller MC. The input voltage across the connection A of the microcontroller MC is converted into a digital signal by means of an analog-to-digital converter and is evaluated in the microcontroller MC.

The heating phase of the electrode filaments E1, E2 prior to the ignition of the gas discharge in the fluorescent lamp LP lasts approximately 600 ms. The microcontroller MC detects the voltage drop across the capacitor C4 of the low-pass filter at two different points in time during the heating phase. The first detection of the voltage drop across the capacitor C4 by means of the microcontroller MC is approximately 30 ms after the beginning of the heating phase, and the second detection is at the end of the heating phase, i.e. approximately 600 ms after the beginning of the heating phase. If the absolute value of the difference between the two voltage values exceeds a predetermined threshold value of, for example, 0.1 V, the voltage value detected at the end of the heating phase is compared with a reference value stored in the microcontroller MC for the purpose of identifying the type of lamp of the fluorescent lamp LP. If the threshold value is not exceeded, no evaluation of the voltage drop across the capacitor C4 or across the measuring resistor R1 is carried out. The time characteristic of the voltage drop across the measuring resistor R1 or across the capacitor C4 of the low-pass filter is correlated with the time characteristic of the electrical resistance of the electrode filaments E1, E2 during the heating phase. The hot resistance of the electrode filaments E1, E2, i.e. their resistance at the end of the heating phase, is different for different types of fluorescent lamps. The hot resistance of the electrode filaments may therefore be used for identifying the type of lamp.

FIGS. 2 to 4 show the time characteristic of the voltage drop across the resistor RI through which the primary-side current of the transformer P1, S1, S2 flows following averaging by means of the low-pass filter R2, C4 for three different operating states of the circuit arrangement according to the preferred exemplary embodiment of the invention.

The time characteristic depicted in FIG. 2 of the voltage drop across the capacitor C4 corresponds to the operation of the circuit arrangement having a fluorescent lamp LP, whose electrode filaments E1, E2 were cold at the beginning of the heating phase, i.e. were at room temperature. The voltage drop across the capacitor C4 thus initially increases, reaches a maximum of 0.48 V after approximately 30 ms, and then decreases continuously so as to assume a minimum of 0.22 V at the end of the heating phase after 600 ms. The maximum is correlated with the cold resistance of the electrode filaments E1, E2, and the minimum at the end of the heating phase is correlated with the hot resistance of the electrode filaments E1, E2. The electrical resistance of the tungsten electrode filaments E1, E2 is temperature-dependent, i.e. it increases as the temperature increases.

FIG. 3 shows the time characteristic of the voltage drop across the capacitor C4 for the same circuit arrangement and for the same fluorescent lamp LP. However, the electrode filaments E1, E2 have not yet completely cooled off at the beginning of the heating phase owing to the last lamp operation. The voltage characteristic illustrated in FIG. 3 thus has a less pronounced maximum of only 0.27 V at approximately 30 ms, and the minimum of the curve is likewise reached at the end of the heating phase but is only 0.20 V.

The time characteristic illustrated in FIG. 4 of the voltage drop across the capacitor C4 corresponds to the operation of the above circuit arrangement having an equivalent resistance in place of the electrode filaments E1 and E2, respectively, of the fluorescent lamp LP. The voltage drop across the capacitor C4 is, apart from the rise during the first approximately 30 ms of the heating phase, independent of time and is approximately 0.22 V.

The microcontroller MC detects the voltage drop across the capacitor C4 for the first time approximately 30 ms after the beginning of the heating phase and for the second time approximately 600 ms after the beginning of the heating phase. If the absolute value of the difference between the two voltage values exceeds a predetermined threshold value of, for example, 0.1 V, the voltage value at the end of the heating phase is compared with a reference value stored in the microcontroller MC and is used for identifying the type of lamp. This is only the case with the voltage characteristic illustrated in FIG. 2. In the other two cases, i.e. in the case of the voltage characteristics illustrated in FIGS. 3 and 4, no evaluation as regards the identification of the type of lamp is carried out. In these two cases, the data stored in the microcontroller MC from the last lamp operation is used for operating the circuit arrangement or the electronic ballast.

Once the preheating phase of the electrode filaments E1, E2 has ended, the required starting voltage for igniting the gas discharge in the fluorescent lamp LP is applied to the capacitor C2 using the resonance step-up method by the switching frequency of the half-bridge inverter T1, T2 being reduced such that it is close to the resonant frequency of the series resonant circuit L1, C2. Once the gas discharge in the fluorescent lamp has been ignited, brightness regulation of the fluorescent lamp LP can be carried out by varying the switching frequency of the half-bridge inverter T1, T2. During the dimming operation of the fluorescent lamp LP, its electrode filaments E1, E2 have a heating current applied to them by means of the transformer P1, S1, S2 and the transistor T3, said heating current flowing in addition to the discharge current through the electrode filaments E1, E2. The heating current or the heating power is set as a function of the brightness of the fluorescent lamp. At a low brightness level, i.e. in the case of severe dimming, of the fluorescent lamp LP, a high heating power is set. The heating power is set by varying the pulse width of the transistor T3, in particular by varying the switch-on time of the transistor T3. The transistor T3 is switched on in synchrony with the transistor T1. The switch-on time of the transistor T3 is 100% of the switch-on time of the transistor T1 at a maximum heating power. At a lower heating power, the switch-on time of the transistor T3 is shorter than the switch-on time of the transistor T1.

FIG. 5 shows a further circuit arrangement which is particularly well suited for the application of the method according to the invention. This circuit arrangement is largely identical to the circuit arrangement illustrated in FIG. 1. Identical components in FIGS. 1 and 5 therefore also have the same reference numerals. In contrast to the circuit arrangement illustrated in FIG. 1, the circuit arrangement illustrated in FIG. 5 has two additional diodes D2, D3 which are each connected in series with a secondary winding S1 and S2, respectively, and an electrode filament E1 and E2, respectively. The arrangement of the diodes D2, D3 and the winding sense of the transformer windings P1, S1, S2 is matched to one another such that the transformer P1, S1, S2 with the diodes D2, D3 and the transistor T3 form a forward converter. During the on phase of the transistor T3, the current through the primary winding P1 induces a heating current for the electrode filaments E1, E2 in the secondary windings S1, S2. During the off phase of the transistor T3, the diodes D2, D3 are reversed-biased, with the result that at this time no heating current can flow. The energy stored in the primary winding P1 is dissipated to the capacitor C1 via the diode D1 during the on phase of the transistor T2.

The invention is not limited to the exemplary embodiment described in more detail above. Instead of evaluating the voltage drop across the resistor R1 during the preheating phase of the electrodes E1, E2 only at the beginning and at the end of the preheating phase, the entire time characteristic of this voltage drop may also be evaluated by means of the microcontroller MC or only the maximum of the voltage drop across the resistor R1 may be compared with the end value of this voltage drop at the end of the preheating phase, in order to make it possible to identify the type of lamp of the low-pressure discharge lamp or fluorescent lamp LP.

What is claimed is:

1. A method for operating at least one low-pressure discharge lamp by means of an inverter, in which the lamp electrodes of the at least one low-pressure discharge lamp have a heating current applied to them during a heating phase prior to the ignition of the gas discharge in the at least one low-pressure discharge lamp by means of a transformer, whose primary-side current is clocked by means of a controllable switching means, and the change in the electrical resistance of at least one lamp electrode is monitored, wherein said controllable switching means is switched in synchrony with a first inverter switching means, and the change in the electrical resistance of said at least one lamp electrode is determined by means of a resistive element which is arranged on the primary side of the transformer by the voltage drop across the resistive element being evaluated at at least two different points in time during the heating phase.

2. The method as claimed in claim 1, wherein the voltage drop across said resistive element is evaluated by means of a low-pass filter.

3. The method as claimed in claim 1, wherein the energy stored in the primary winding is dissipated during the switch-off time of the controllable switching means with the aid of a second inverter switching means and a diode circuit.

4. The method as claimed in claim 1, wherein a second point in time, at which the voltage drop across said resistive element is evaluated, is arranged at the end of said heating phase.

5. The method as claimed in claim 1, wherein, once the gas discharge in the at least one low-pressure discharge lamp has been ignited, the voltage drop across said resistive element is evaluated for the purpose of regulating the heating power of the lamp electrodes, and the heating power is varied by varying the switch-on time of the controllable switching means, the controllable switching means being switched on in synchrony with the first inverter switching means, and its switchon time being less than or equal to the switch-on time of the first inverter switching means.

6. The method as claimed in claim 1, wherein a first point in time, at which the voltage drop across said resistive element is evaluated, is arranged in a time window of 10 ms to 50 ms after the beginning of said heating phase.

7. The method as claimed in claim 6, wherein a second point in time, at which the voltage drop across said resistive element is evaluated, is arranged at the end of said heating phase.

8. The method as claimed in claim 1, wherein a maximum value for the voltage drop across said resistive element is determined.

9. The method as claimed in claim 8, wherein a second point in time, at which the voltage drop across said resistive element is evaluated, is arranged at the end of said heating phase.

* * * * *